T. B. STEPHENSON.
MACHINE FOR CASTING BULLETS, &c.
APPLICATION FILED AUG. 11, 1916.
1,319,672.
Patented Oct. 21, 1919.
5 SHEETS—SHEET 2.
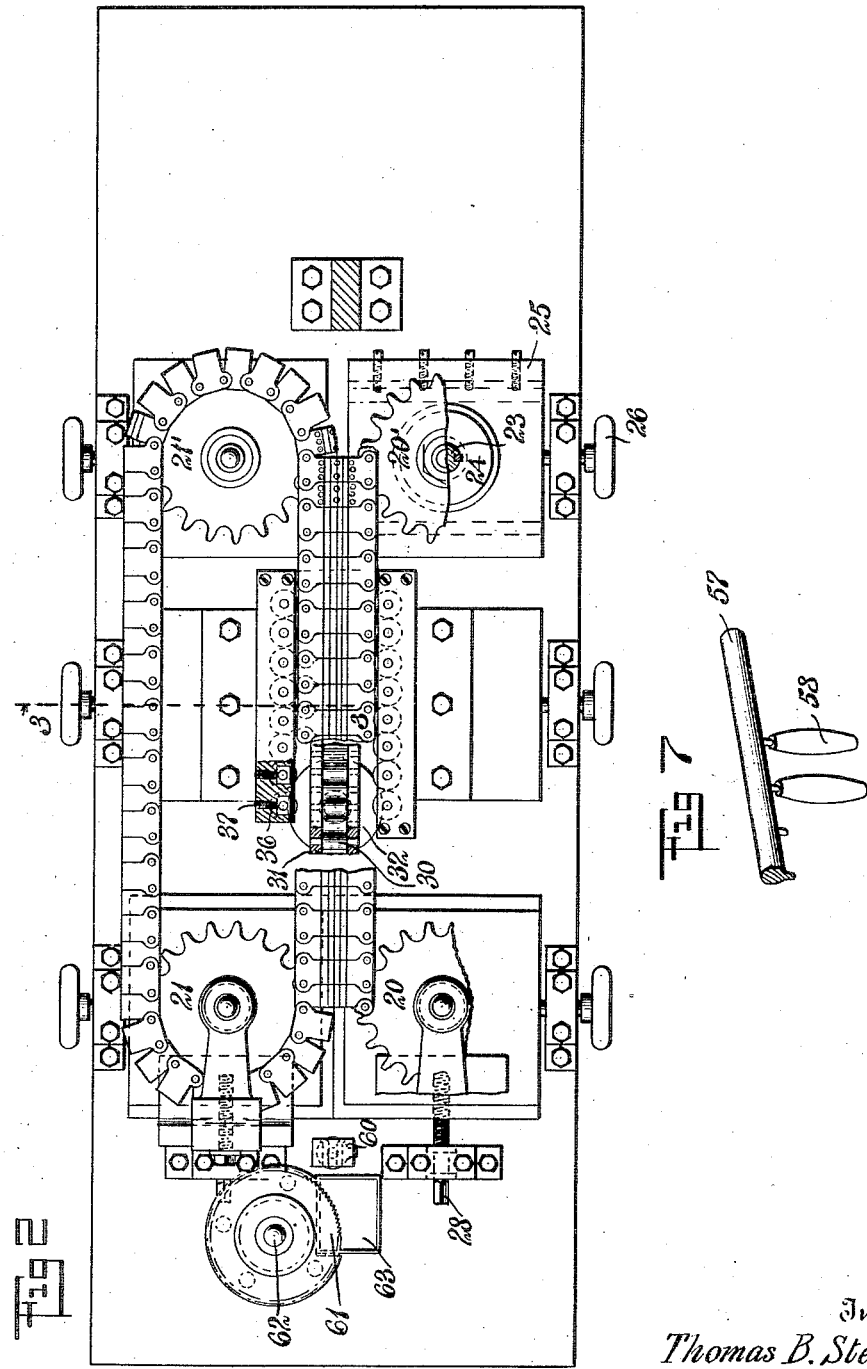
Inventor
Thomas B. Stephenson
By his Attorneys

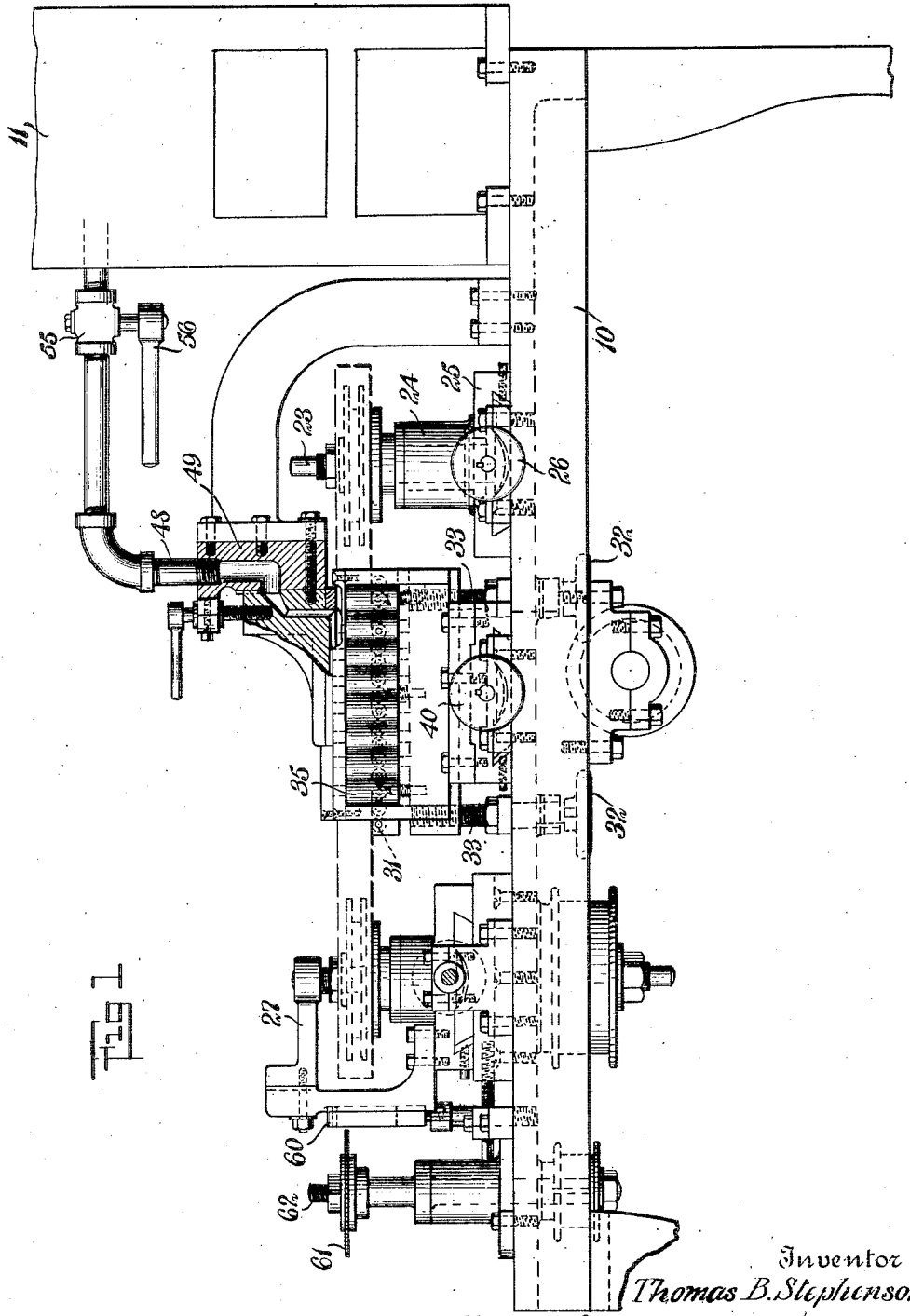

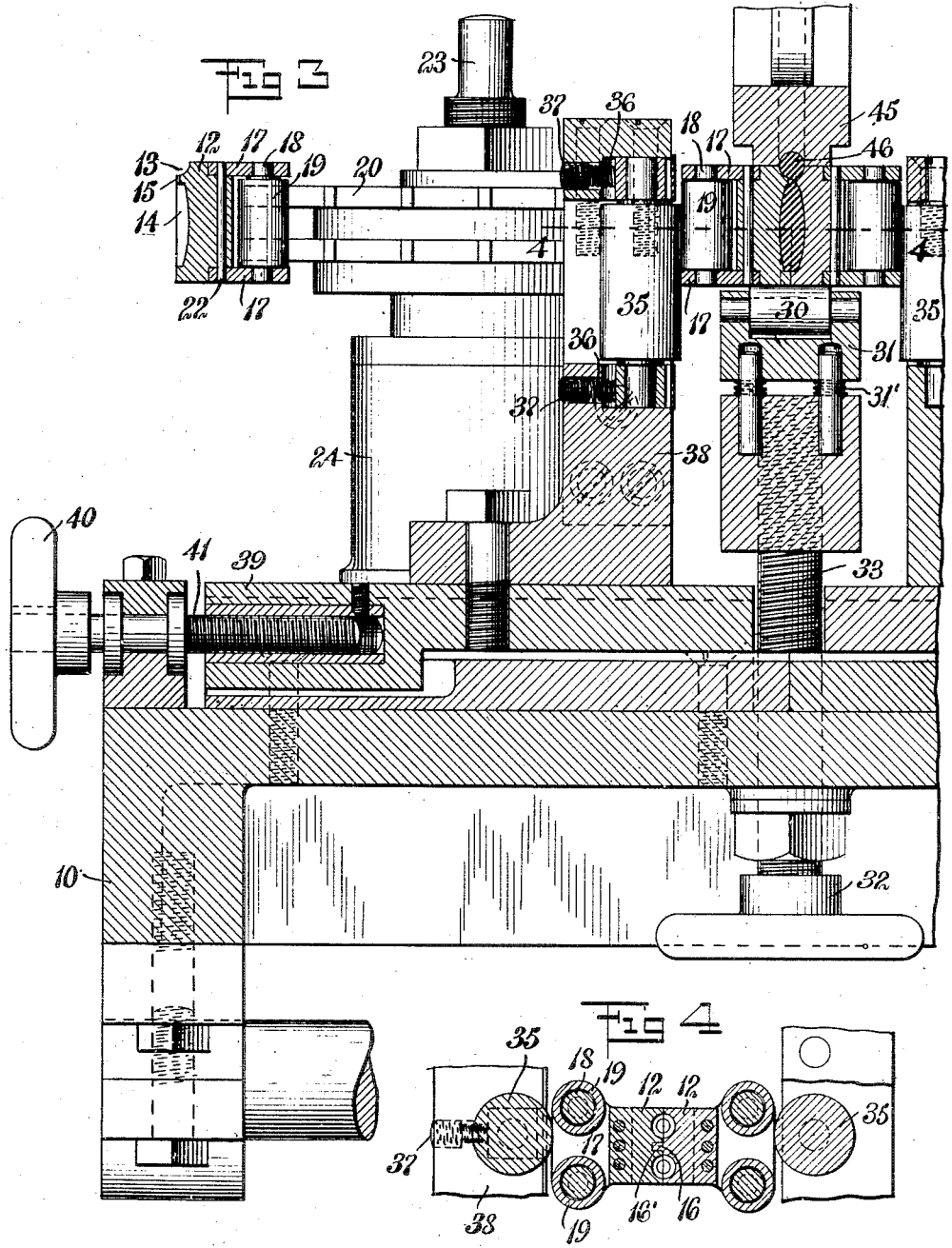

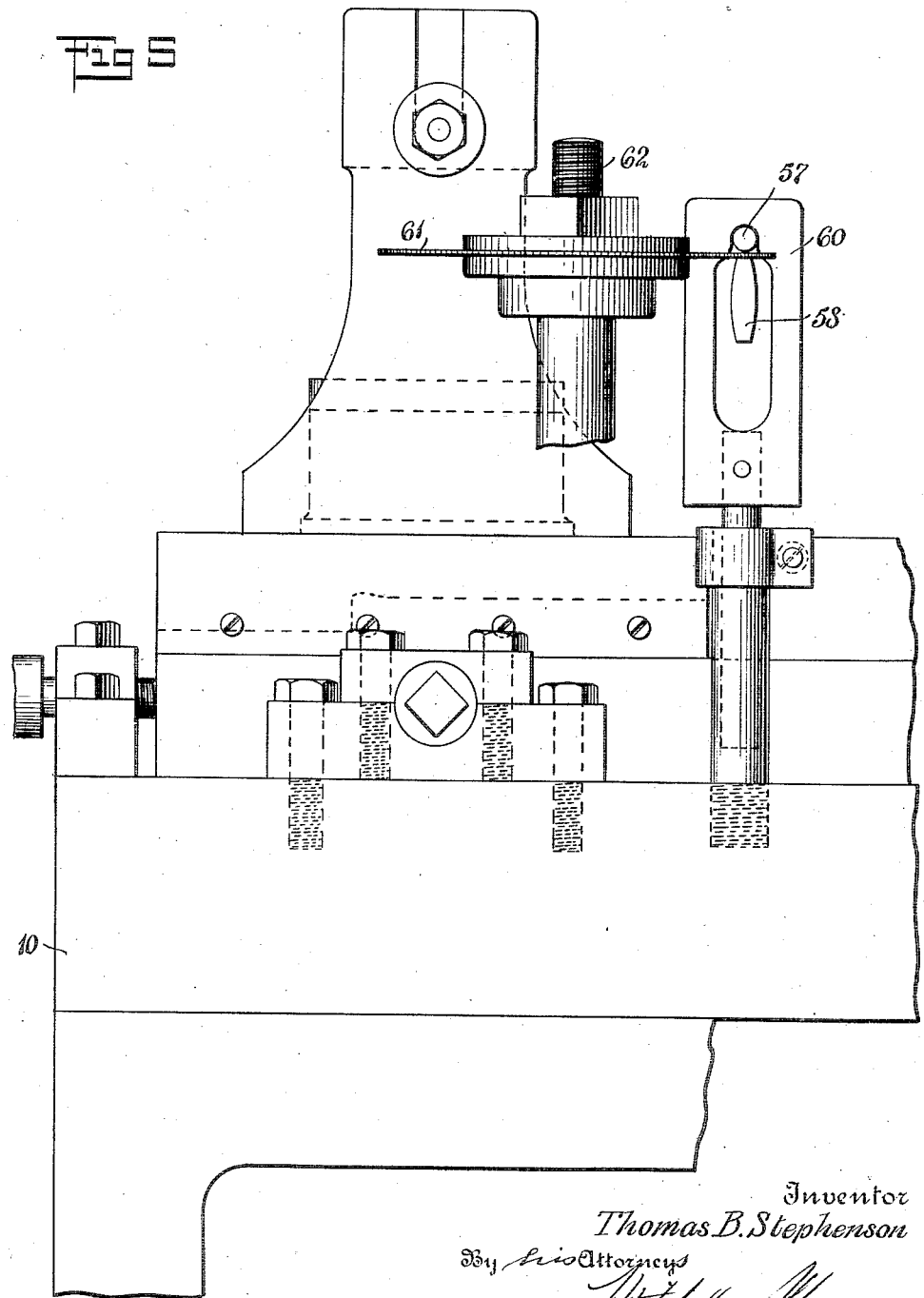

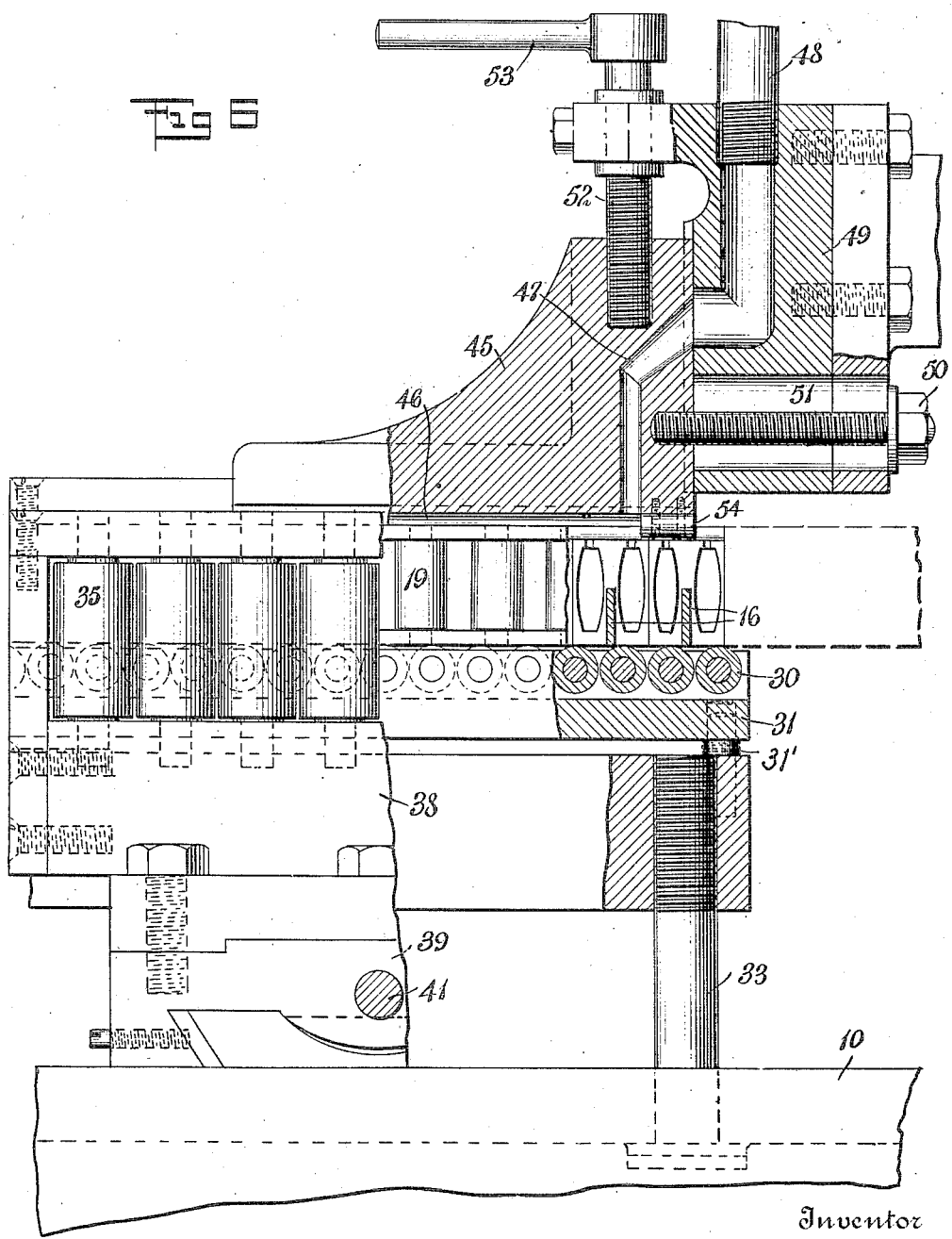

UNITED STATES PATENT OFFICE.

THOMAS B. STEPHENSON, OF FORESTVILLE, CONNECTICUT, ASSIGNOR OF ONE-HALF TO FRANK S. TRUMBULL, OF BRIDGEPORT, CONNECTICUT.

MACHINE FOR CASTING BULLETS, &c.

1,319,672.   Specification of Letters Patent.   Patented Oct. 21, 1919.

Application filed August 11, 1916. Serial No. 114,320.

*To all whom it may concern:*

Be it known that I, THOMAS B. STEPHENSON, a citizen of the United States of America, residing at Forestville, Connecticut, have invented a new and useful Machine for Casting Bullets, &c., of which the following is a specification.

My invention relates to a machine for automatically casting metal, particularly for the purpose of making bullets. Certain features of the invention are also applicable to the casting of a continuous rod either with or without laterally projecting members. The main object is to provide a reliable machine which can be operated at high speed with little attention and which can be adjusted to take up wear, and for producing products of different sizes. The mold proper consists of three parts. Two of the parts are in segments arranged to travel with links of chains on horizontal sprockets. The other part is stationary and overstands the movable segments. Preferably the chains and movable mold sections are pressed toward each other by means of rollers and are pressed upward against the under face of the stationary part by means of rollers. The metal to be cast is kept in a molten condition in a suitable receptacle and allowed to flow continuously into a channel formed by the upper faces of the movable mold segments and the lower face of the stationary part of the mold. As the chains and movable segments move forwardly, a rod is cast along the top thereof with the bullets depending in recesses in the adjacent faces of the movable mold parts. As the cast rod with depending bullets is released by the lateral separation of the movable mold parts, it is guided by a suitable support and adjacent thereto a saw rapidly rotating cuts off the depending bullets. The rod part may, if desired, be cut up into smaller parts by means of a flying shear or a melting flame.

Figure 1 is a side view of the principal parts of the machine embodying the improvements of my invention.

Fig. 2 is a plan view, portions being broken away to show details of construction.

Fig. 3 is a vertical transverse sectional view on the plane of the line 3—3, of Fig. 2, but on a larger scale, and showing the parts of the mold and the method of supporting the same.

Fig. 4 is a horizontal sectional view on the plane of the line 4—4, of Fig. 3, showing two of the movable mold parts.

Fig. 5 is an end elevation showing a guide for the product and a saw for cutting off the bullets from the rod portion.

Fig. 6 is a longitudinal vertical sectional view with parts broken away to show the mold elements at the casting point.

Fig. 7 is a perspective view showing a fragment of the product with two of the bullets suspended from the rod.

The table 10 supports all the parts of the machine including the furnace and reservoir 11 for the molten metal.

Each of the mold segments 12—12 has a longitudinal channel 13 along its upper edge, a recess 14 for the body of the bullet and a connecting passage 15. Corresponding mold sections have interfitting projections and recesses 16—16' for holding them in proper alinement. Each section is supported by upper and lower plates 17—17 which constitute the links of the chain. These links also have pins 18 and rollers 19 for coaction with sprockets such as 20—20', 21—21'. A mold section may be secured to its plates for instance by pins 22. Each sprocket is carried by a spindle such as 23, supported in a bearing such as 24 on a guide such as 25 so that it may be transversely adjusted as by means of a hand wheel 26 so that the sprockets and chains may be adjusted laterally toward and from each other to take up play between the parts or to allow for mold sections of different sizes. The upper end of each spindle may be steadied by means of an arm such as 27. Preferably, the sprockets at the delivery end of the machine are adjustable lengthwise in the machine, for example, by means of screws such as 28 so as to take up slack in the chains or allow for chains of greater or less length.

The central portion of the mold chain is supported by means of rollers such as 30 carried by a longitudinal bar 31. This bar may be forced upward by the springs 31' and adjusted upwardly by operation of a hand wheel or hand wheels 32 and screws 33 to raise or lower the supporting rolls 30.

The corresponding mold sections are preferably held yieldingly together during the molding period by rollers such as 35 under pressure of springs 36 and adjusting screws 37. The rollers 35 are carried by a frame 38 which is mounted on a slide 39 and transversely adjustable by means of a hand wheel 40 and screw 41.

The upper part of the mold is formed by a stationary member 45 having the channel 46 in its lower face extending along immediately above channels 13 in the upper meeting edges of the movable mold sections. The member 45 also has a passage 47 connected with a pipe 48 which leads from the reservoir for the molten metal. The member 45 is clamped to the support 49 by means of a bolt 50 in a vertical elongated slot 51. This member 45 may be adjusted vertically by means of the screw 52 and handle 53 so as to cause the mold sections to fit more snugly together and to allow for molds of different sizes. A gate 54 is secured to the lower face of the member 45 so as to act as an abutment or stop filling the channel in the mold members. The flow of metal to the molds may be controlled by the valve 55 and handle 56.

In operation the molten metal flows from the reservoir 11 through the pipe 48 and passage 47 to the mold, and as the mold parts 12—12 move forwardly, the metal continues to run into the recesses 14 and channel 13 forming a continuous rod 57 with bullets 58 depending, as shown in Fig. 7, the metal cooling as the parts move forward. As the chains and molds diverge at the outer end of the machine, the rod and bullets emerge and pass through a guide 60 of suitable shape and size. Adjacent this guide is located a saw 61 rotatable on a vertical spindle 62 at such a height as to cut off the bullets 58 from the rod 57 and allow them to drop into a suitable receptacle 63. A rod may thus serve as a support for the bullets to convey them from the molds to a point where they can be collected in a suitable receptacle. The rod itself may afterward be cut up into suitable lengths by any suitable means, or the rod may be utilized as such.

It will be obvious that the mold recesses 14 may be of any suitable size and shape and that other articles may be cast in this manner, as well as bullets.

What I claim is:

1. In a casting machine, the combination of horizontally movable chains, mold segments carried thereby and provided with a continuous channel along adjacent upper edges, and stationary means with a mold element above said channel for supplying molten metal on and into said channel as said chains move forwardly.

2. In a casting machine, horizontally movable mold sections, a stationary mold element located above said movable sections and means for supplying molten metal beneath the stationary element to produce a continuous rod.

3. In a casting machine, horizontally movable mold sections, a stationary mold element located above said movable elements and means for supplying molten metal beneath the stationary element to produce a continuous rod, and means for vertically adjusting said stationary element.

4. In a casting machine, horizontally movable mold elements, a portion of a continuous mold element as a cover therefor and rollers for supporting said movable elements in casting position.

5. In a casting machine a pair of chains and sprockets therefor, mold elements carried by said chains, a stationary mold and delivery element and roller members for holding the molds in engagement during the casting operation.

6. In a casting machine, a pair of chains and sprockets therefor, mold elements carried by said chains, roller members for holding the mold elements in engagement during the casting operation, and means for adjusting said roller elements.

7. In a casting machine, horizontally movable chains, mold elements carried thereby, rollers for supporting said elements and means for vertically adjusting said rollers.

8. In a casting machine, a plurality of movable mold elements, each element having a portion of a longitudinal channel continuous along its upper edge, a recess located below said channel and a passage connecting said channel and said recess, means for moving said elements so as to bring the longitudinal channels into alinement, an upper member constituting a cover for said channel and means for continuously pouring molten metal into said channel whereby a portion is cast into said channel in the form of a continuous rod and a portion of said metal is cast in the mold recesses.

9. In a casting machine, a plurality of movable mold elements, each element having a portion of a longitudinal channel continuous along its upper edge, a recess located below said channel and a passage connecting said channel and said recess, means for moving said elements so as to bring the longitudinal channels into alinement, an upper member constituting a cover for said channel, means for continuously pouring molten metal into said channel whereby a portion is cast into said channel in the form of a continuous rod and a portion of said metal is cast in the mold recesses and means for vertically adjusting said upper mold member.

10. In a casting machine, a plurality of movable mold members, an upper mold member coöperating therewith and having a passage for molten metal, said upper member being adjustable toward and from the movable mold members.

11. In a casting machine, a stationary mold and delivery section, two sets of movable mold segments and spring pressed rolls on opposite sides thereof for holding them yieldingly in engagement with each other and directly beneath said stationary mold and delivery section.

12. In a casting machine, two pairs of sprockets, a chain carried by each pair of sprockets and mold elements carried by said chains, one pair of sprockets being adjustable laterally relative to the other pair of sprockets.

13. In a casting machine, two pairs of sprockets, a chain carried by each pair of sprockets and mold elements carried by said chains, and means for effecting vertical adjustment of said molds at the casting point of said machine.

14. In combination, in a casting machine, continuously propelled molds and manually operated adjusting means to adapt said machine to different sets of continually propelled molds of various sizes.

15. In combination, in a casting machine, a stationary casting pot, a delivery element, continuously propelled molds in juxtaposition beneath said delivery element, and manually operated adjusting means to adapt said machine to different sets of continuously propelled molds of various sizes.

16. In a casting machine, traveling mold elements, a relatively stationary delivery member above the traveling mold elements for delivering the casting material to said traveling mold elements, said traveling mold elements and stationary delivery member being relatively vertically adjustable with respect to each other and said relatively stationary delivery member and traveling mold elements being further relatively laterally adjustable in respect to each other.

17. In a casting machine, a stationary casting pot, vertically adjustable delivery means, traveling molds, said vertically adjustable means including parts to form and restrain metal as it is delivered to the molds.

18. In a casting machine, a plurality of movable mold segments, a stationary mold member above said segments, and laterally and vertically manually adjustable rolls having facial connection with said mold segments to hold said mold segments in casting position.

19. In combination, a casting machine, a stationary casting pot with a fixed point of delivery, vertically adjustable delivery means, horizontally movable molds passing beneath said delivery means, means to laterally adjust said molds with respect to said delivery means, and means to vertically adjust said molds to the delivery means, means for manually adjusting lengthwise and sidewise movement of said molds and spring pressed rolls to hold said molds in facial engagement.

20. In a casting machine, two pairs of sprockets, a chain carried by each pair of sprockets, coöperating mold sections carried by said chains, and means for adjusting one sprocket of each pair lengthwise of the chain carried thereby and also at an angle to the longitudinal plane of the chain.

21. In a bullet-making machine; the combination of two endless chains composed of pivoted blocks, wheels to carry said chains to permit the outer faces of the blocks of one length of one chain to travel in surface contact with the outer faces of the blocks of the adjacent length of the other chain, means for giving motion to said chains by driving connections between one of said wheels and one chain and between the latter and the second chain to cause said adjacent lengths thereof to travel in the same direction and at the same speed and for causing the blocks of one chain to register with the contacting blocks of the other chain, means for pressing the outer faces of the blocks of the adjacent lengths of said two chains into surface contact, said blocks having their outer upper edges chamfered to produce a longitudinal channel to receive molten metal when said blocks coincide and contact with each other, the outer face of each block having a series of half molds formed therein and having recessed gateways in the face of each block extending between said half molds and said chamfered edge to form complete bullet molds between said chains and a passage way to each bullet mold from said channel when said blocks of said two chains contact.

22. In a bullet-making machine; the combination of two endless chains composed of pivoted blocks, wheels to carry said chains to cause the faces of the blocks of one length of chain to lie adjacent to the blocks of the adjacent length of the other chain, rollers and springs to press said rollers against the inner surface of one chain and opposed rollers to bear against the inner surface of the other chain at the part where the two chains are adjacent to press the outer faces of the blocks of the adjacent lengths of the two chains into surface contact, means for giving motion to said chains to cause the blocks of the adjacent lengths of the chains to travel in the same direction and at the same speed and to cause the blocks of one chain to register with the contacting blocks of the other chain, the outer face of each block having half molds formed therein to compose entire molds when the blocks are brought into face contact, each block having a chamfered edge to compose a longitudinal channel when said blocks are brought together to receive molten metal, and said blocks having recessed gateways to form passages to conduct said molten metal from said channel to said molds.

23. In a bullet making machine, the combination of two endless chains composed of pivoted blocks, wheels to carry said chains to cause the faces of the blocks of one length of chain to lie adjacent to the blocks of the adjacent length of the other chain, means bearing against the inner surfaces of the two chains to press the outer faces of the blocks of the adjacent lengths of the two chains into surface contact, means for giving motion to said chains to cause the blocks of the adjacent lengths of the chains to travel in the same direction and at the same speed and to cause the blocks of one chain to register with the contacting blocks of the other chain, the outer faces of the blocks having one-half molds formed therein to compose entire molds when the blocks are brought in face contact, said same blocks having opposed chamfered edges to compose a longitudinal channel when the blocks are brought together to receive molten material, and having recessed gate-ways forming passages to conduct the molten metal from said channel to the molds.

24. In a casting machine, mold chains and coöperating engaging mold sections carried thereby, guides for said mold chains and spring-pressed rollers mounted in said guides for yieldingly holding the coöperating mold sections in engagement.

THOMAS B. STEPHENSON.